United States Patent
Takahashi et al.

(10) Patent No.: US 11,428,153 B2
(45) Date of Patent: Aug. 30, 2022

(54) TURBOCHARGER

(71) Applicant: TOYOTA JIDOSHA KABUSHIKI KAISHA, Toyota (JP)

(72) Inventors: Junya Takahashi, Nisshin (JP); Takeshi Murase, Iwakura (JP); Masaaki Matsuda, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/468,992

(22) Filed: Sep. 8, 2021

(65) Prior Publication Data

US 2022/0154632 A1    May 19, 2022

(30) Foreign Application Priority Data

Nov. 18, 2020    (JP) ............................. JP2020-191698

(51) Int. Cl.
*F02B 37/18*    (2006.01)
*F01D 25/24*    (2006.01)

(52) U.S. Cl.
CPC ............ *F02B 37/186* (2013.01); *F01D 25/24* (2013.01); *F02B 37/183* (2013.01); *F05D 2220/40* (2013.01)

(58) Field of Classification Search
CPC ...... F02B 37/186; F02B 37/183; F01D 25/24; F05D 2220/40
See application file for complete search history.

(56) References Cited

U.S. PATENT DOCUMENTS

2020/0173351 A1    6/2020    Saeki
2020/0318531 A1*   10/2020   Sparrer ................. F02B 37/186

FOREIGN PATENT DOCUMENTS

| CN | 109209622 A | 1/2019 |
| JP | 2020-084923 A | 6/2020 |

* cited by examiner

*Primary Examiner* — Audrey B. Walter
*Assistant Examiner* — Edward Bushard
(74) *Attorney, Agent, or Firm* — Oliff PLC

(57) ABSTRACT

A turbocharger includes a turbine housing and a wastegate valve. The turbine housing defines two bypass passages. The wastegate valve opens and closes the two bypass passages. The turbine housing has a valve seat surface that is a flat surface that the wastegate valve contacts. The wastegate valve has a valve surface and a depression. The valve surface is a flat surface that faces the valve seat surface when the wastegate valve is in a closed state. The depression is depressed from the valve surface. The depression is located at a portion that faces a region located between openings of the two bypass passages when the wastegate valve is in the closed state.

5 Claims, 5 Drawing Sheets

TURBOCHARGER

CROSS-REFERENCE TO RELATED APPLICATION

This application claims priority to Japanese Patent Application No. 2020-191698 filed on Nov. 18, 2020, incorporated herein by reference in its entirety.

BACKGROUND

1. Technical Field

The present disclosure relates to a turbocharger.

2. Description of Related Art

The turbocharger described in Japanese Unexamined Patent Application Publication No. 2020-084923 (JP 2020-084923 A) includes a turbine wheel, a turbine housing, and a wastegate valve. The turbine housing houses the turbine wheel. The turbine housing defines two bypass passages. Each bypass passage provides a bypass between an exhaust gas upstream side and an exhaust gas downstream side relative to the turbine wheel. The turbine housing has a valve seat surface that is a flat surface that the wastegate valve contacts when the wastegate valve is in a closed state. On the other hand, the wastegate valve has a valve surface that is a flat surface and faces the valve seat surface when the wastegate valve is in the closed state.

SUMMARY

In a turbocharger like JP 2020-084923 A, part of the turbine housing near the valve seat surface is heated by exhaust gas flowing through the two bypass passages. When the part near the valve seat surface is heated and thermally expands, the valve seat surface deforms, which may prevent the valve seat surface and the valve surface from appropriately contacting each other when the wastegate valve is in the closed state.

A turbocharger for solving this problem includes: a turbine wheel that is rotated by a flow of exhaust gas; a turbine housing that houses the turbine wheel and defines a plurality of bypass passages that provides a bypass between an exhaust gas upstream side and an exhaust gas downstream side relative to the turbine wheel; and a wastegate valve that opens and closes the bypass passages. The turbine housing has a valve seat surface that is a flat surface and contacts the wastegate valve when the wastegate valve is in a closed state. The wastegate valve has a valve surface that is a flat surface and faces the valve seat surface when the wastegate valve is in the closed state, and a depression that is depressed from the valve surface. The depression is located at a portion that faces a region of an inner surface of the turbine housing located between openings of the bypass passages when the wastegate valve is in the closed state.

In this configuration, the depression is present at the portion facing the region of the valve seat surface that is located between the bypass passages and especially susceptible to heating by the exhaust gas. In this configuration, therefore, even when the valve seat surface expands under the influence of heating by the exhaust gas, the expanded part is contained inside the depression of the wastegate valve and less likely to contact the wastegate valve. Thus, when the wastegate valve is in the closed state, the valve seat surface and the valve surface can appropriately contact each other.

In the above configuration, when an imaginary straight line connecting the centers of openings of adjacent ones of the bypass passages to each other is drawn, the depression may be located at a portion that faces the imaginary straight line when the wastegate valve is in the closed state.

In this configuration, the position of the depression corresponds to the portion of the valve seat surface that is most susceptible to heating by the exhaust gas flowing through the adjacent bypass passages, i.e., the portion that is expected to expand most. Thus, this configuration can favorably reduce the likelihood that an expanded part of the valve seat surface may contact the wastegate valve.

A turbocharger for solving the above problem includes: a turbine wheel that is rotated by a flow of exhaust gas; a turbine housing that houses the turbine wheel and defines a plurality of bypass passages that provides a bypass between an exhaust gas upstream side and an exhaust gas downstream side relative to the turbine wheel; and a wastegate valve that opens and closes the bypass passages. The turbine housing has a valve seat surface that is a flat surface and contacts the wastegate valve when the wastegate valve is in a closed state, and a depression that is depressed from the valve seat surface. The wastegate valve has a valve surface that is a flat surface and faces the valve seat surface when the wastegate valve is in the closed state. The depression is located in a region of an inner surface of the turbine housing located between openings of the bypass passages.

In this configuration, the depression is present in the region of the turbine housing that is located between the bypass passages and especially susceptible to heating by the exhaust gas. In this configuration, therefore, even when the turbine housing expands under the influence of heating by the exhaust gas, the wastegate valve is less likely to contact the portion of the turbine housing located between the bypass passages. Thus, when the wastegate valve is in the closed state, the valve seat surface and the valve surface can appropriately contact each other.

In the above configuration, the depression may be located over an entire area of the region.

In this configuration, the depression is present over the entire area of the portion that expands to a great extent by being heated. Thus, this configuration can ensure that even when parts of the turbine housing near the bypass passages expand, the valve seat surface and the valve surface appropriately contact each other.

In the above configuration, the turbine housing may have a through-hole that extends through a wall of the turbine housing. The wastegate valve may have a shaft that extends through the through-hole and is rotatably supported by the turbine housing, and a valve body that extends in a radial direction of the shaft from an end of the shaft that is located inside the turbine housing. The shaft and the valve body may be an integrally molded part.

Since the valve body does not swing relatively to the shaft in this wastegate valve, the valve surface cannot adapt to the valve seat surface when the valve seat surface expands. Applying the configuration involving the depression to a turbocharger including such a wastegate valve is particularly effective.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

General Configuration of Internal Combustion Engine

An embodiment of the present disclosure will be described below in accordance with FIG. 1 to FIG. 6. First, the general configuration of an internal combustion engine 10 of a vehicle to which a turbocharger 20 of the present disclosure is applied will be described.

Figure 1:
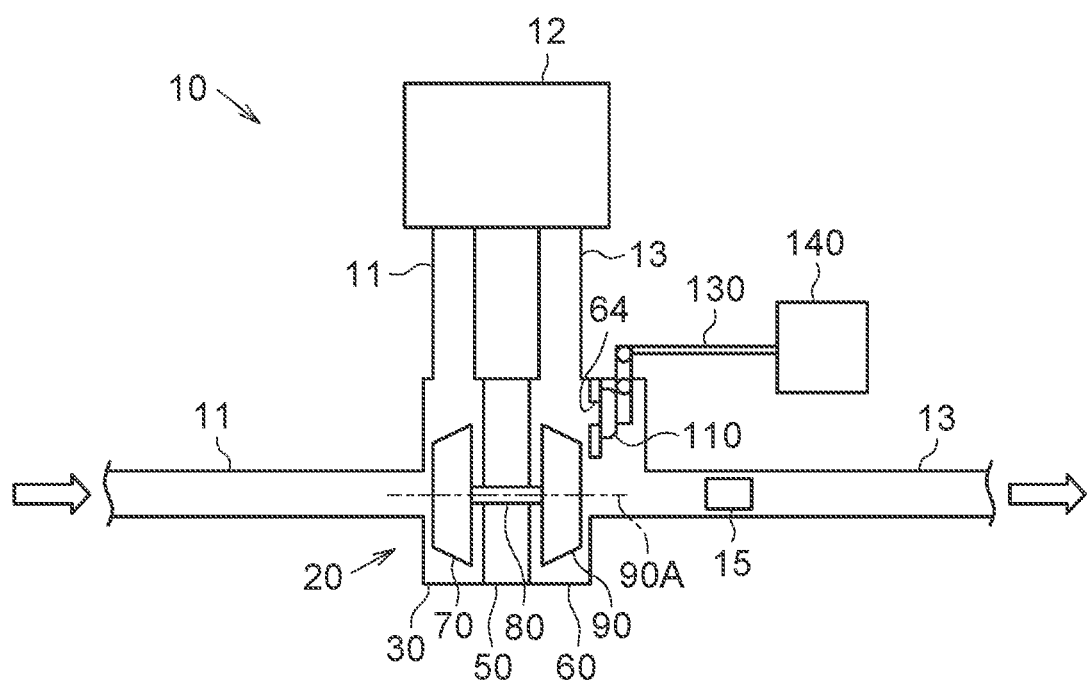
FIG. 1 is a schematic view of an internal combustion engine.

As shown in FIG. 1, the internal combustion engine 10 includes an intake passage 11, a cylinder 12, an exhaust passage 13, a catalyst 15, and the turbocharger 20. The intake passage 11 introduces intake air from an outside of the internal combustion engine 10. The cylinder 12 is connected to the intake passage 11. In the cylinder 12, fuel and the intake air are mixed and combusted. The exhaust passage 13 is connected to the cylinder 12. The exhaust passage 13 discharges exhaust gas from the cylinder 12. The catalyst 15 is located at an intermediate portion of the exhaust passage 13. The catalyst 15 removes harmful components from the exhaust gas flowing through the exhaust passage 13.

The turbocharger 20 includes a compressor housing 30, a bearing housing 50, a turbine housing 60, a compressor wheel 70, a coupling shaft 80, and a turbine wheel 90.

The compressor housing 30 is mounted at an intermediate portion of the intake passage 11. The turbine housing 60 is mounted at a portion of the exhaust passage 13, upstream of the catalyst 15. The bearing housing 50 is fixed to each of the compressor housing 30 and the turbine housing 60 and connects the compressor housing 30 and the turbine housing 60 to each other. Thus, the turbocharger 20 is provided across the intake passage 11 and the exhaust passage 13.

The turbine housing 60 houses the turbine wheel 90. The bearing housing 50 houses the coupling shaft 80. The bearing housing 50 rotatably supports the coupling shaft 80 through a bearing (not shown). A first end of the coupling shaft 80 is connected to the turbine wheel 90. The compressor housing 30 houses the compressor wheel 70. The compressor wheel 70 is connected to a second end of the coupling shaft 80. Thus, the compressor wheel 70 is coupled to the turbine wheel 90 through the coupling shaft 80.

When the turbine wheel 90 is rotated by exhaust gas flowing through an inside of the turbine housing 60, the compressor wheel 70 is rotated along with the turbine wheel 90 through the coupling shaft 80. As the compressor wheel 70 rotates, the intake air inside the compressor housing 30 is compressed.

Configuration of Turbocharger

Next, the specific configuration of the turbocharger 20 will be described.

Figure 2:
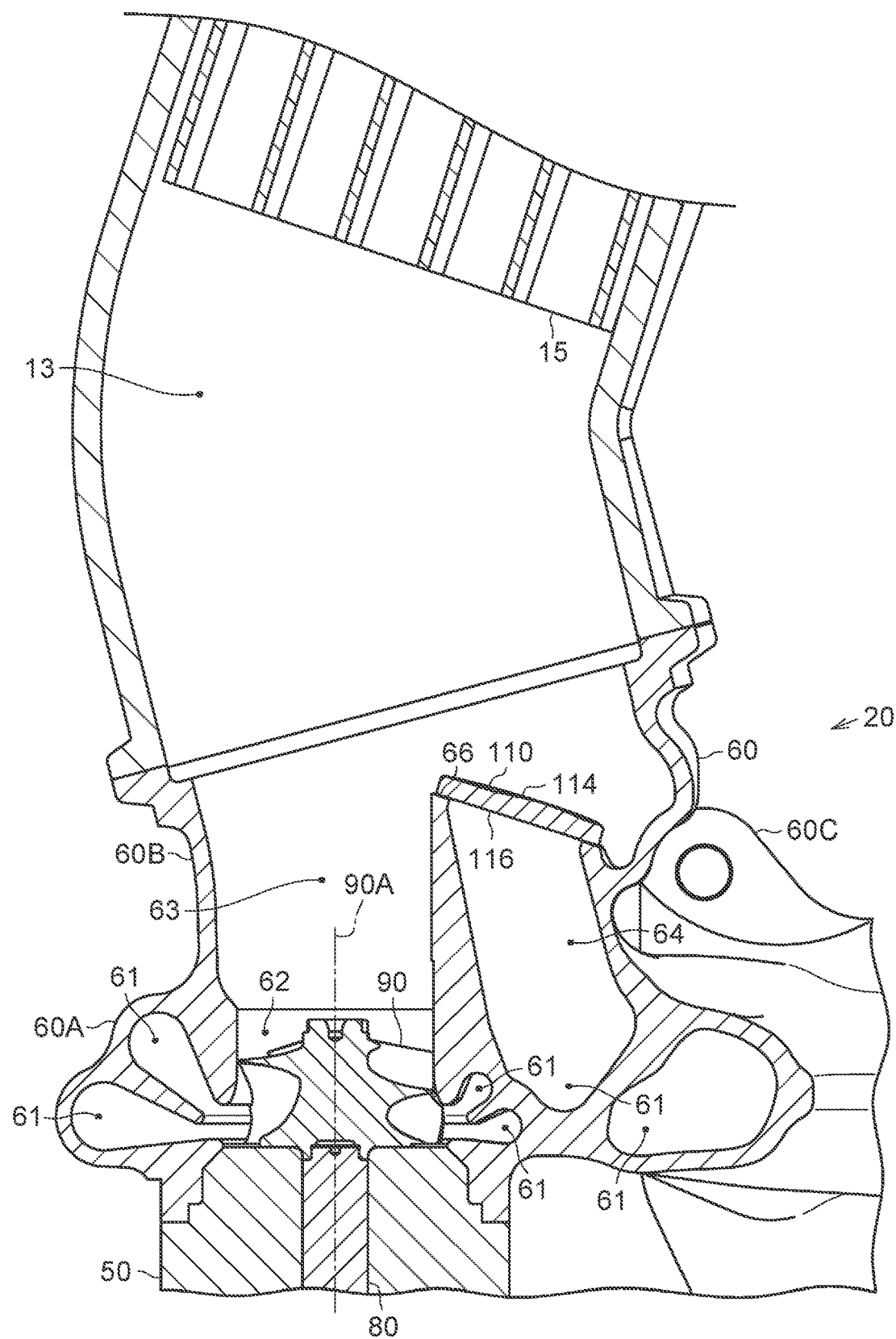
FIG. 2 is a sectional view showing a configuration around a turbine housing.

As shown in FIG. 2, the turbine housing 60 includes an arc part 60A, a tubular part 60B, and a flange part 60C. The tubular part 60B has a substantially cylindrical shape. The tubular part 60B extends roughly along a rotational axis 90A that is the center of rotation of the turbine wheel 90. The arc part 60A extends so as to surround the outer circumference of the tubular part 60B and has a substantially arc shape. The flange part 60C is located at an upstream end of the arc part 60A. The flange part 60C is fixed to the exhaust passage 13 at a portion on an upstream side relative to the turbine housing 60.

As shown in FIG. 2, the turbine housing 60 defines, as space for the exhaust gas to flow through, two scroll passages 61, a housing space 62, an exhaust passage 63, and two bypass passages 64. In FIG. 2, one bypass passage 64 is shown. Each scroll passage 61 is located inside the arc part 60A and the tubular part 60B. The scroll passages 61 extend in an arc shape so as to surround the turbine wheel 90. Upstream ends of the scroll passages 61 are connected to the exhaust passage 13, on the upstream side relative to the turbine housing 60. Downstream ends of the scroll passages 61 are connected to the housing space 62. The two scroll passages 61 extend substantially parallel to each other. The housing space 62 is a part of an internal space of the tubular part 60B in which the turbine wheel 90 is located. The housing space 62 is connected to the exhaust passage 63. The exhaust passage 63 is a part of the internal space of the tubular part 60B that includes an end of the tubular part 60B on the opposite side from the bearing housing 50, i.e., the upper end thereof in FIG. 2. A downstream end of the exhaust passage 63 is connected to the exhaust passage 13, on the downstream side relative to the turbine housing 60. Each bypass passage 64 is located inside the arc part 60A and the tubular part 60B. Each bypass passage 64 connects the scroll passage 61 and the exhaust passage 63 to each other. Thus, the bypass passages 64 provide a bypass between an exhaust gas upstream side and an exhaust gas downstream side relative to the turbine wheel 90.

Figure 3:
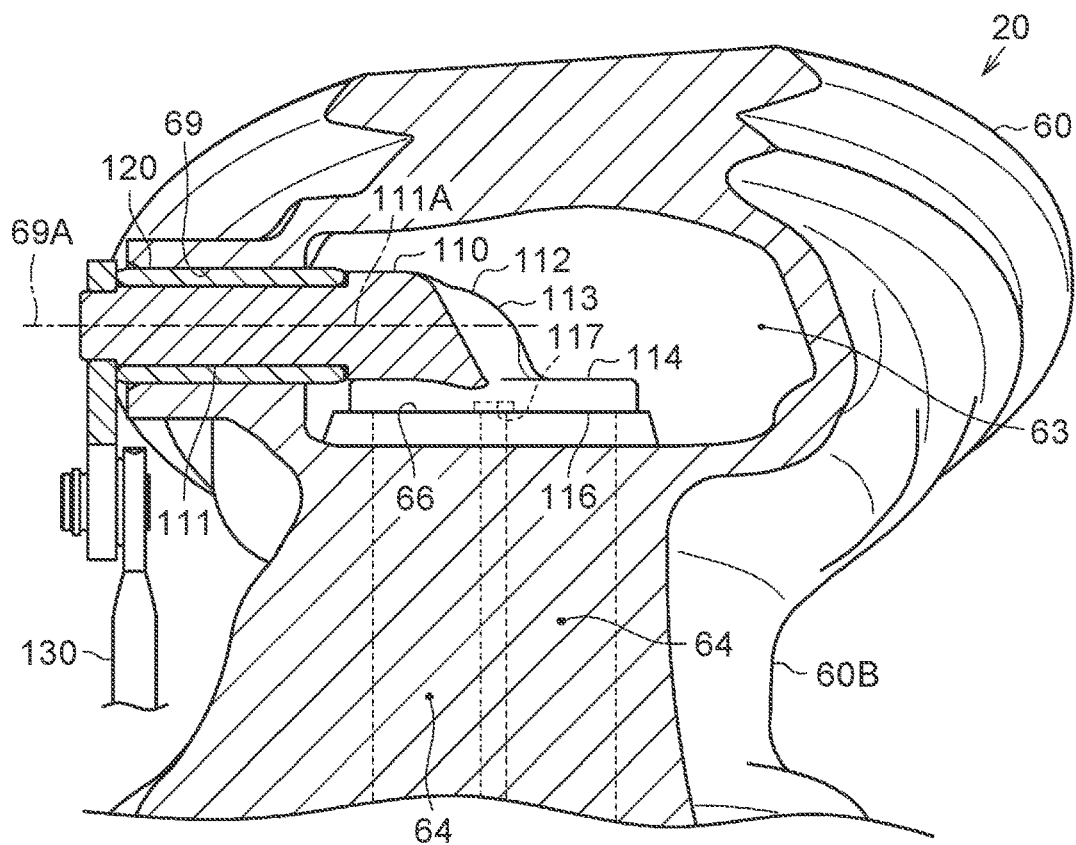
FIG. 3 is a sectional view showing a configuration around a wastegate valve.

As shown in FIG. 3, the turbine housing 60 includes a valve seat surface 66 and a through-hole 69. The valve seat surface 66 is a part of an inner wall surface of the turbine housing 60 defining the exhaust passage 63 and is a flat surface surrounding opening edges of the two bypass passages 64. Thus, each bypass passage 64 opens in the valve seat surface 66. A part of an inner surface of the turbine housing 60 that includes the valve seat surface 66 is raised compared with other portions. As indicated by long dashed double-short dashed lines in FIG. 6, the opening edge of each bypass passage 64 has a substantially semicircular shape when seen from a direction orthogonal to the valve seat surface 66. The bypass passages 64 are located side by side. Thus, when seen from the direction orthogonal to the valve seat surface 66, a shape combining the opening edges of the two bypass passages 64 is circular as a whole.

As shown in FIG. 3, the through-hole 69 extends through a wall of the turbine housing 60. The through-hole 69 is located at a part of the wall of the turbine housing 60 that defines the exhaust passage 63. A central axis 69A of the through-hole 69 is parallel to the valve seat surface 66. The central axis 69A of the through-hole 69 extends in a direction in which the two adjacent bypass passages 64 are located side by side, i.e., in the left-right direction in FIG. 3. When seen from a direction along the central axis 69A of the through-hole 69, the through-hole 69 has a shape of a substantially perfect circle.

As shown in FIG. 1 and FIG. 3, the turbocharger 20 includes a wastegate valve 110, a bush 120, a link mechanism 130, and an actuator 140. As shown in FIG. 3, the bush 120 has a substantially cylindrical shape. The outside diameter of the bush 120 is substantially equal to the inside diameter of the through-hole 69. The bush 120 is located inside the through-hole 69.

As shown in FIG. 3, the wastegate valve 110 includes a shaft 111 and a valve body 112. The shaft 111 has a substantially columnar shape. The outside diameter of the shaft 111 is substantially equal to the inside diameter of the bush 120. The shaft 111 is passed through the bush 120. Thus, the shaft 111 extends through the through-hole 69 of the turbine housing 60. The turbine housing 60 rotatably supports the shaft 111 through the bush 120. A central axis 111A of the shaft 111 coincides with the central axis 69A of the through-hole 69.

Figure 4:
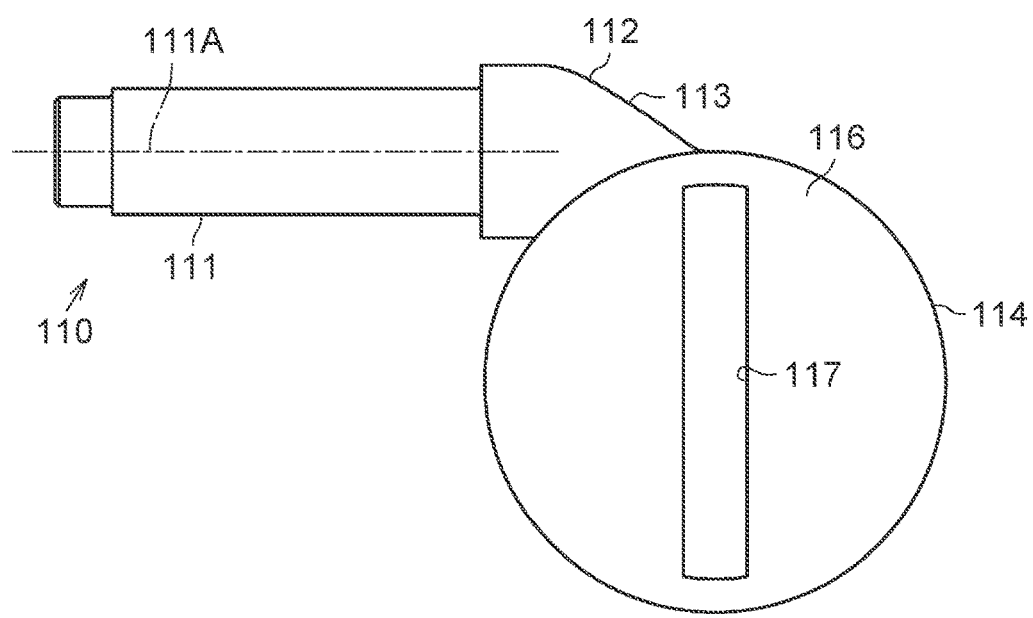
FIG. 4 is a bottom view of the wastegate valve.

As shown in FIG. 4, the valve body 112 includes a connection part 113 and a valve main body 114. The connection part 113 extends from the shaft 111 in a radial direction of the shaft 111. As shown in FIG. 3, the connection part 113 is located at an end of the shaft 111 that is located inside the turbine housing 60, i.e., at the right end of the shaft 111 in FIG. 3. As shown in FIG. 3, the valve main body 114 is connected to an end of the connection part 113 that is located on a radially outer side of the shaft 111. As shown in FIG. 4, the valve main body 114 has a substantially circular plate shape. A surface of the valve main body 114 on the opposite side from the connection part 113, i.e., the surface thereof on the near side in the sheet of FIG. 4 functions as a valve surface 116. The valve surface 116 is a flat surface. The valve surface 116 faces the valve seat surface 66 when the wastegate valve 110 is in a closed state. The wastegate valve 110 is an integrally molded part in which the shaft 111 and the valve body 112 are integrally molded. The wastegate valve 110 is integrally molded, for example, by casting.

As shown in FIG. 3, the link mechanism 130 is coupled to an end of the shaft 111 that is located outside the turbine housing 60. As shown in FIG. 1, the actuator 140 is coupled to the link mechanism 130. The actuator 140 transmits a driving force to the link mechanism 130. The link mechanism 130 transmits the driving force from the actuator 140 to the wastegate valve 110 to open or close the bypass passages 64.

Specifically, when the wastegate valve 110 shifts from an open state to a closed state, the driving force of the actuator 140 is transmitted to the shaft 111 through the link mechanism 130, so that the shaft 111 rotates in a first rotation direction of circumferential directions of the shaft 111 relatively to the turbine housing 60. Then, the valve surface 116 of the wastegate valve 110 contacts the valve seat surface 66 of the turbine housing 60. Thus, when the wastegate valve 110 is in the closed state, the valve surface 116 of the wastegate valve 110 faces the valve seat surface 66 of the turbine housing 60, so that the downstream ends of the bypass passages 64 are covered by the valve surface 116 of the wastegate valve 110. In this embodiment, the closed state is a state where the valve surface 116 of the wastegate valve 110 contacts the valve seat surface 66 of the turbine housing 60 and the wastegate valve 110 cannot rotate any further toward the closing side.

On the other hand, when the wastegate valve 110 shifts from the closed state to the open state, the driving force of the actuator 140 is transmitted to the shaft 111 through the link mechanism 130, so that the shaft 111 rotates in a second rotation direction of the circumferential directions of the shaft 111 relatively to the turbine housing 60. Then, the valve surface 116 of the wastegate valve 110 is separated from the valve seat surface 66 of the turbine housing 60. Thus, when the wastegate valve 110 is in the open state, the downstream ends of the bypass passages 64 are not covered by the valve surface 116 of the wastegate valve 110.

Configuration of Depression

Next, a depression 117 of the wastegate valve 110 will be described.

Figure 6:
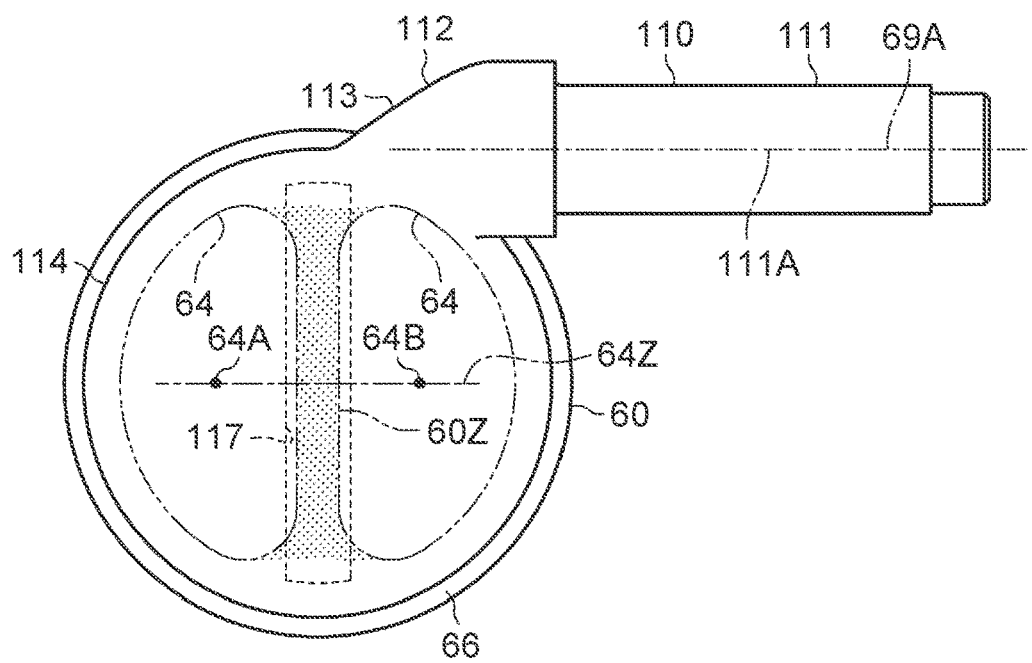
FIG. 6 is an illustration showing a configuration around the wastegate valve.

Hereinafter, as shown in FIG. 6, a region of an inner surface of the turbine housing 60 that is located between the openings of the two bypass passages 64 in the valve seat surface 66 will be referred to as a region 60Z. The center of the opening of one of the two adjacent bypass passages 64 in the valve seat surface 66 will be referred to as the center 64A, and the center of the opening of the other one of the two adjacent bypass passages 64 in the valve seat surface 66 will be referred to as the center 64B. Further, an imaginary straight line connecting the center 64A and the center 64B to each other will be referred to as an imaginary straight line 64Z. The center of an opening means the geometric center of the opening shape as seen from the direction orthogonal to the valve seat surface 66.

As shown in FIG. 6, when seen from the direction orthogonal to the valve seat surface 66, the region 60Z extends in a direction orthogonal to the central axis 69A of the through-hole 69, i.e., in the up-down direction in FIG. 6. The dimension of the region 60Z in a width direction orthogonal to a longitudinal direction, i.e., the dimension thereof in the left-right direction in FIG. 6 is substantially constant. At parts including ends in the longitudinal direction, the dimension of the region 60Z in the width direction increases toward the ends in the longitudinal direction.

Figure 5:
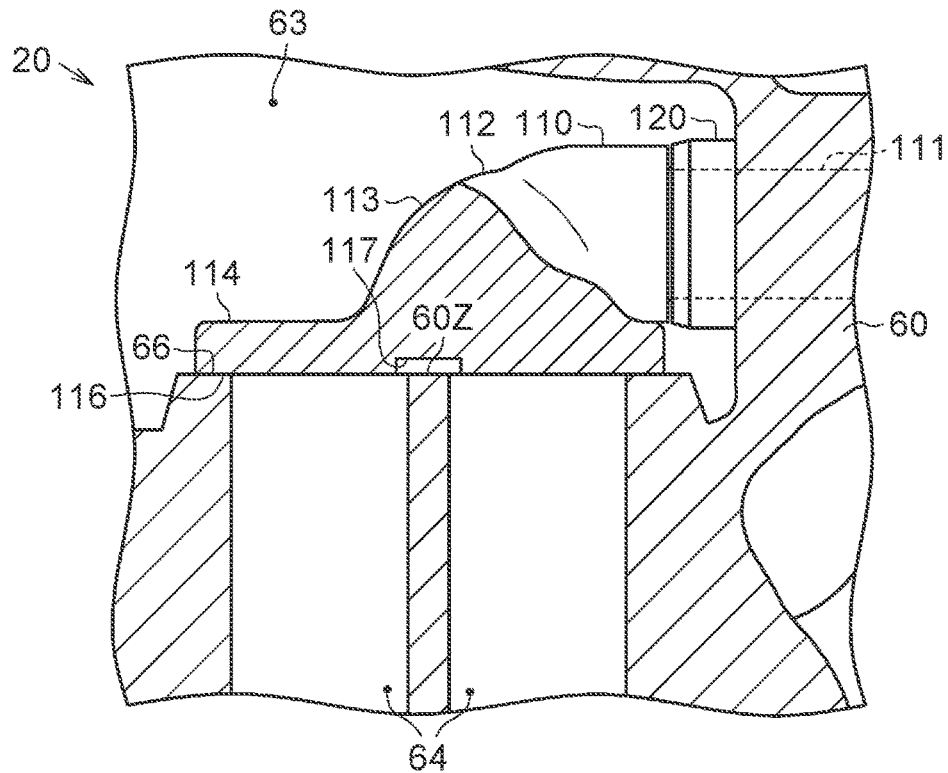
FIG. 5 is a sectional view showing a configuration around the wastegate valve.

As shown in FIG. 5, the valve main body 114 of the wastegate valve 110 has the depression 117. The depression 117 is depressed from the valve surface 116. The depth of the depression 117 is constant along the entire depression 117. For example, the depth of the depression 117 is about 2 mm to 3 mm. As shown in FIG. 4, the depression 117 is located substantially at the center of the valve surface 116. When seen from a direction orthogonal to the valve surface 116, the depression 117 extends in a direction orthogonal to the central axis 111A of the shaft 111, i.e., in the up-down direction in FIG. 4. When seen from the direction orthogonal to the valve surface 116, the depression 117 has a substantially rectangular shape. As shown in FIG. 6, the dimension of the depression 117 in a longitudinal direction is slightly larger than the dimension of the region 60Z in the longitudinal direction. The dimension of the depression 117 in a width direction is slightly larger than the dimension of the region 60Z in the width direction at a center part thereof in the longitudinal direction.

As shown in FIG. 6, the center of the depression 117 coincides with the center of the region 60Z when seen from the direction orthogonal to the valve seat surface 66 while the wastegate valve 110 is in the closed state. Thus, the depression 117 is located at a portion that faces the region 60Z when the wastegate valve 110 is in the closed state. Further, the depression 117 is located at a portion that faces the imaginary straight line 64Z when the wastegate valve 110 is in the closed state. Thus, the depression 117 has such a size and is located at such a position that the depression 117 faces most of the region 60Z when the wastegate valve 110 is in the closed state.

Workings of Embodiment

In the turbocharger 20, the exhaust gas flows through the two bypass passages 64 when the wastegate valve 110 is in the open state. When the exhaust gas thus flows through the bypass passages 64, part of the wall of the turbine housing 60 near the valve seat surface 66 is heated as the heat of the exhaust gas is transmitted thereto. In this case, the region 60Z of the valve seat surface 66 is located between the two bypass passages 64 and especially susceptible to the heat of the exhaust gas. As a result, the region 60Z of the valve seat surface 66 may expand significantly and protrude compared with other portions of the valve seat surface 66.

Effects of Embodiment (1) In the embodiment, the depression 117 of the wastegate valve 110 is located at the portion that faces the region 60Z of the valve seat surface 66 when the wastegate valve 110 is in the closed state. Therefore, even when the region 60Z of the valve seat surface 66 expands under the influence of heating by the exhaust gas flowing through the two bypass passages 64, the expanded part is contained inside the depression 117. Thus, when the wastegate valve 110 is in the closed state, the valve surface 116 and the valve seat surface 66 can appropriately contact each other.

(2) Part of the region 60Z of the valve seat surface 66 that is located on the imaginary straight line 64Z is most susceptible to heating by the exhaust gas flowing through the two bypass passages 64. Therefore, the part of the region 60Z of the valve seat surface 66 located on the imaginary straight line 64Z is expected to undergo the largest amount of expansion.

In the embodiment, the depression 117 is located specifically at the portion of the region 60Z that faces the imaginary straight line 64Z when the wastegate valve 110 is in the closed state. Thus providing the depression 117 so as to correspond to the portion of the valve seat surface 66 that is expected to expand most can favorably reduce the likelihood that the expanded part of the valve seat surface 66 may contact the wastegate valve 110.

(3) In the embodiment, the wastegate valve 110 is an integrally molded part in which the shaft 111 and the valve body 112 are integrally molded. Thus, since the valve body 112 does not swing relatively to the shaft 111 in the wastegate valve 110, the valve surface 116 cannot adapt to the valve seat surface 66 when the valve seat surface 66 expands. Therefore, applying the configuration involving the depression 117 to the turbocharger 20 including such a wastegate valve 110 is particularly effective.

MODIFIED EXAMPLES

The embodiment can be implemented with the following changes made thereto. The embodiment and the following modified examples can be implemented in combination to such an extent that no technical inconsistency arises.

Depression

In the above embodiment, the number of the depression 117 can be changed. For example, the wastegate valve 110 may have a plurality of depressions 117. As long as the depression 117 is located at the portion facing the region 60Z, the number of the depression 117 may be one, or two or more.

In the above embodiment, the position of the depression can be changed. For example, as long as the depression 117 is located at the portion facing the region 60Z, the depression 117 need not be located at the portion facing the imaginary straight line 64Z. For example, the depression 117 may be located at a portion facing an end of the region 60Z in the longitudinal direction. It is preferable that the depression 117 be located at a portion facing a portion of the region 60Z of the valve seat surface 66 that undergoes the largest amount of expansion.

Instead of or in addition to the depression 117 of the wastegate valve 110, a depression 67 may be provided in the turbine housing 60. In the example shown in FIG. 7, the turbine housing 60 has the depression 67. The depression 67 is depressed from the valve seat surface 66. The depression 67 is located over an entire area of the region 60Z.

In this configuration, the depression 67 is present in the region 60Z of the turbine housing 60 that is located between the two bypass passages 64 and especially susceptible to heating by the exhaust gas. In this configuration, therefore, even when the region 60Z of the turbine housing 60 expands under the influence of heating by the exhaust gas, the wastegate valve 110 is less likely to contact the region 60Z. Thus, when the wastegate valve 110 is in the closed state, the valve seat surface 66 and the valve surface 116 can appropriately contact each other. Moreover, the depression is present over the entire area of the region 60Z that expands to a great extent by being heated. This can ensure that even when parts of the turbine housing 60 near the bypass passages 64 expand, the valve seat surface 66 and the valve surface 116 appropriately contact each other.

Figure 7:
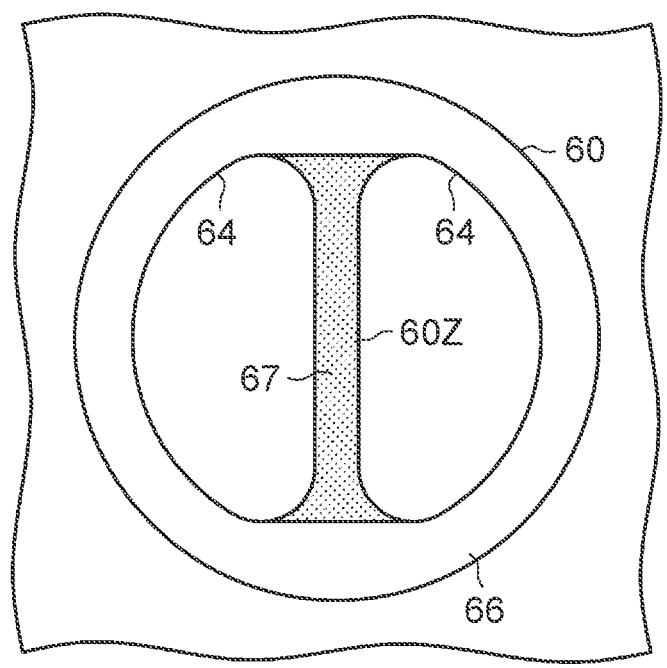
FIG. 7 is a plan view showing a configuration around a valve seat surface according to a modified example.

In the modified example shown in FIG. 7, the depression 67 need not be located over the entire area of the region 60Z. For example, the depression 67 may be provided at a part of the region 60Z, at the center or an end thereof in the longitudinal direction. These configurations can also reduce the likelihood that the wastegate valve 110 may contact the region 60Z when the region 60Z expands. As with the depression 117, it is preferable that the depression 67 be provided at a portion of the region 60Z that is expected to undergo the largest amount of expansion.

Bypass Passage

In the above embodiment, the shape of the bypass passages 64 may be changed.

In the above embodiment, the number of the bypass passages 64 may be three or more. In this case, the depression 117 should be located at a portion facing a region that is located between the openings of adjacent two bypass passages 64 of the three or more bypass passages 64 in the valve seat surface 66. Similarly, the depression 67 should be located in a region that is located between the openings of two adjacent bypass passages 64 of the three or more bypass passages 64 in the valve seat surface 66.

Other Configurations

In the above embodiment, the wastegate valve 110 need not be an integrally molded part in which the shaft 111 and the valve body 112 are integrally molded. For example, in the wastegate valve 110, the valve body 112 may be capable of swinging relatively to the shaft 111.

What is claimed is:
1. A turbocharger comprising:
a turbine wheel that is rotated by a flow of exhaust gas;
a turbine housing that houses the turbine wheel and defines a plurality of bypass passages that provides a bypass between an exhaust gas upstream side and an exhaust gas downstream side relative to the turbine wheel; and
a wastegate valve that opens and closes the bypass passages, wherein:

the turbine housing has a valve seat surface that is a flat surface and contacts the wastegate valve when the wastegate valve is in a closed state;

the wastegate valve has a valve surface that is a flat surface and faces the valve seat surface when the wastegate valve is in the closed state, and a depression that is depressed from the valve surface; and the depression is located at a portion that faces a region of an inner surface of the turbine housing located between openings of the bypass passages when the wastegate valve is in the closed state.

2. The turbocharger according to claim 1, wherein, when an imaginary straight line connecting centers of openings of adjacent ones of the bypass passages to each other is drawn, the depression is located at a portion that faces the imaginary straight line when the wastegate valve is in the closed state.

3. The turbocharger according to claim 1, wherein:

the turbine housing has a through-hole that extends through a wall of the turbine housing;

the wastegate valve has a shaft that extends through the through-hole and is rotatably supported by the turbine housing, and a valve body that extends in a radial direction of the shaft from an end of the shaft that is located inside the turbine housing; and the shaft and the valve body are an integrally molded part.

4. A turbocharger comprising:

a turbine wheel that is rotated by a flow of exhaust gas;

a turbine housing that houses the turbine wheel and defines a plurality of bypass passages that provides a bypass between an exhaust gas upstream side and an exhaust gas downstream side relative to the turbine wheel; and a wastegate valve that opens and closes the bypass passages, wherein:

the turbine housing has a valve seat surface that is a flat surface and contacts the wastegate valve when the wastegate valve is in a closed state, and a depression that is depressed from the valve seat surface;

the wastegate valve has a valve surface that is a flat surface and faces the valve seat surface when the wastegate valve is in the closed state; and the depression is located in a region of an inner surface of the turbine housing located between openings of the bypass passages.

5. The turbocharger according to claim 4, wherein the depression is located over an entire area of the region.

* * * * *